J. SHEPARD.
Plow.

No. 91,972.

Patented June 29, 1869.

United States Patent Office.

JOSIAH SHEPARD, OF NEWPORT, MAINE.

Letters Patent No. 91,972, dated June 29, 1869.

IMPROVEMENT IN PLOWS.

The Schedule referred to in these Letters Patent and making part of the same.

*To all whom it may concern:*

Be it known that I, JOSIAH SHEPARD, of Newport, in the county of Penobscot, and State of Maine, have invented a new and useful Improvement in Plows; and I do hereby declare that the following is a full, clear, and exact description thereof, which will enable others skilled in the art to make and use the same, reference being had to the accompanying drawing, forming part of this specification, in which—

Similar letters of reference indicate corresponding parts.

My invention has for its object to improve the construction of plows, so as to diminish the friction at the bottom and landside of the plow, and thus lessen the draught; and It consists in providing the same with a long roller, extending between the landside and mould-board, a friction-wheel within the landside, and in making the rear lower edges of the landside higher than the forward part, so that the latter only may bear upon the ground.

A represents the beam, B, the handles, and C, the mould-board of the plow, about the construction of which parts there is nothing new.

D is a long roller, extending from the mould-board C to the landside E of the plow.

The roller D is pivoted to bearings formed upon or attached to the mould-board C and landside E, in such positions that the face of the roller D may rest upon the bottom of the furrow as the plow is drawn forward.

F is a horizontal roller or wheel, pivoted in a slot in the rear part of the landside E, in such a position that the face of the said roller F may rest against the landside of the cut as the plow is drawn forward.

The roller D and wheel or roller F are provided with scrapers, G and H, respectively, by which any soil that might adhere to said rollers is scraped off, to prevent them from becoming clogged with said soil.

Figure 1:
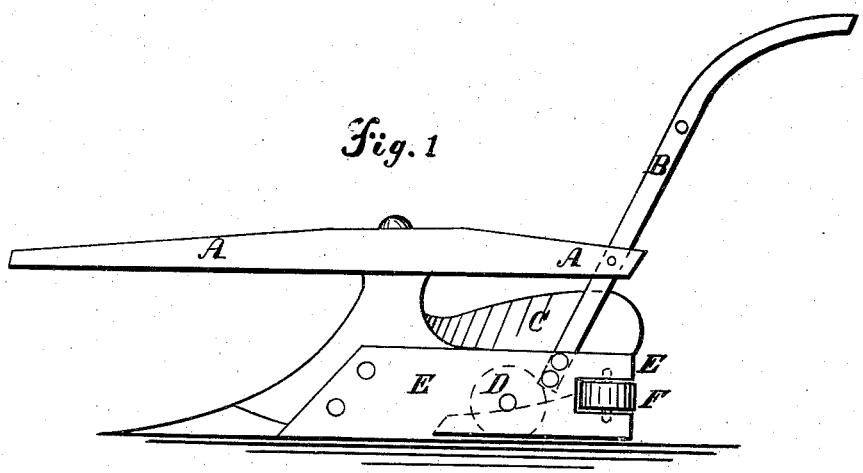
Figure 1 is a view of the landside of my improved plow.
Figure 2:
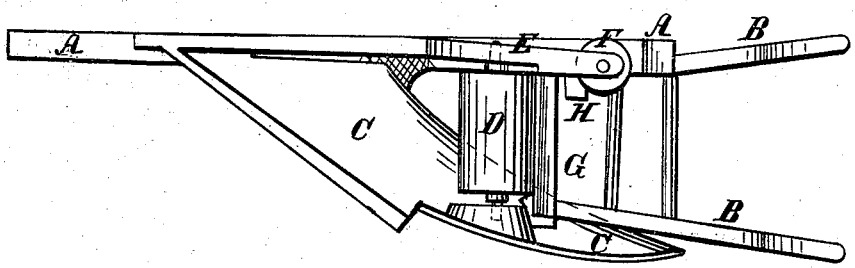
Figure 2 is a bottom view of the same.

The rear lower part of the landside E of the plow is cut away, as shown in fig. 1, so that only the forward part of the bottom of the plow may bear upon the ground.

By these improvements in the construction of plows, the friction upon the landside and bottom of the furrow will be greatly diminished, thus greatly diminishing the draught of the plow.

Having thus described my invention,

What I claim as new, and desire to secure by Letters Patent, is—

An improved plow, provided with a long roller, D, and horizontal roller or wheel F, and having the rear lower part of the landside cut away, substantially as herein shown and described, and for the purpose set forth.

JOSIAH SHEPARD.

Witnesses:
C. H. SHEPARD,
ATKINSON HOBART.